United States Patent [19]
Muchel et al.

[11] 4,215,914
[45] Aug. 5, 1980

[54] OPTICAL SYSTEM HAVING A RADIAL DIFFERENCE IN REFRACTIVE INDEX

[75] Inventors: Franz Muchel, Königsbronn; Fritz Strähle, Oberkochen, both of Fed. Rep. of Germany

[73] Assignee: Carl Zeiss-Stiftung, Oberkochen, Fed. Rep. of Germany

[21] Appl. No.: 968,630

[22] Filed: Dec. 12, 1978

[30] Foreign Application Priority Data

Dec. 21, 1977 [DE] Fed. Rep. of Germany ....... 2756989

[51] Int. Cl.² ............................................... G02B 3/00
[52] U.S. Cl. ............................................... 350/175 GN
[58] Field of Search ................................. 350/175 GN

[56] References Cited

U.S. PATENT DOCUMENTS

| 1,943,521 | 1/1934 | Ewald | 350/175 GN |
| 2,547,416 | 4/1951 | Skellett | 350/175 GN |

*Primary Examiner*—Paul A. Sacher
*Attorney, Agent, or Firm*—Stonebraker, Shepard & Stephens

[57] ABSTRACT

An optical system in which at least one of the elements is made from so-called gradient glass having a radial difference in refractive index. The element having this radial difference may be either a lens with at least one curved surface, or a plane-parallel plate. The radial variation in refractive index varies in accordance with a formula which is given.

7 Claims, 6 Drawing Figures

OPTICAL SYSTEM HAVING A RADIAL DIFFERENCE IN REFRACTIVE INDEX

BACKGROUND OF THE INVENTION

This invention relates to an optical system in which at least one element is a so-called gradient glass having a radial difference in refractive index.

The correction of the image defects of an optical system is carried out by suitable combinations of different lenses which differ with respect to their index of refraction, their radii, and their thichnesses. In addition to the use of aspherical surfaces it is also known to use lenses which have an index of refraction which is dependent on their position.

In West German Auslegeschrift (provisional patent) 1,913,358, optical elements having a radial difference in refractive index as well as methods for the manufacture thereof are described. This auslegeschrift relates to light-conducting optical glass bodies, and discloses a method with which, by means of an ion-exchange transverse to the direction of the passage of light through the light guide, the concentration of at least two types of cations change in opposite direction over the entire cross section of the glass body. As a result, the indices of refraction continuously decrease or increase respectively in said direction, so that the light path is curved in the direction of increasing index of refraction.

Furthermore, in West German Offenlegungsschrift (published patent application) 1,939,478 there is disclosed a lens element which consists of a translucent body having a distribution of the index of refraction substantially in accord with the relationship $$n = N(1 \pm ar^2)$$

where N is the index of refraction in the center of a cross sectional surface perpendicular to the central axis of the body, n is the index of refraction at a radial distance r from the center, and a is a positive constant. The published application utilizes the fact that translucent materials having the above indicated distribution of the index of refraction have a lens effect, and mentions as one example for the use of the invention a microscope in which such a lens element with radial difference in refractive index is used as an objective. No information is given as to the image-forming qualities or the aberration correction of such a microscope.

SUMMARY OF THE INVENTION

The object of the present invention is to improve the correction of the off-axis image defects of optical systems.

This object is achieved in accordance with the invention in the manner that the radial difference in refractive index of at least one gradient glass used in the system follows the exponential function $$n = n_o \cdot e^{Kh}$$

in which the independent variable h contained in the exponent represents the radial distance of the optical element from the central axis and the dependent variable n represents the difference in refractive index, the independent variable h contained in the exponent being multiplied by a constant, material-dependent factor K of the gradient glass and the factor $n_o$ being the difference in refractive index of the gradient glass in the center of the lens.

In one advantageous embodiment of the invention the element having a radial difference in refractive index is positioned at a place in the optical system where the aperture rays imaging an axial image point have smaller heights than the rays imaging an off-axis point.

The optical element with radial difference in refractive index can be developed as a lens having at least one curved limiting surface, or can be a plane-parallel plate.

The plane-parallel plate is advisedly arranged in one of the air spaces of the optical system, or behind the last member of the optical system.

The advantages obtained with the invention consist, especially, in the fact that, for the correction of the image defects of optical systems, there are obtained further degrees of freedom which can be applied in particular to the correction of the image defects of the off-axis region.

BRIEF DESCRIPTION OF THE DRAWINGS

One illustrative embodiment of the invention is shown in the drawings and will be described in further detail below. In the drawing.

DETAILED DESCRIPTION

Figure 1:
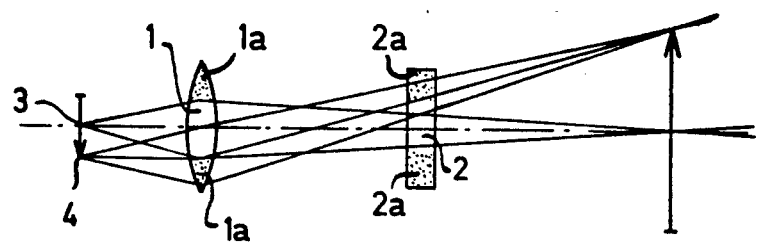
FIG. 1 is a diagrammatic showing of optical elements with radial difference in refractive index, positioned in accordance with the invention.

FIG. 1 shows the ray path between a lens and a plane-parallel plate to illustrate the present invention. In the central regions 1 of the lens and 2 of the plane-parallel plate they have a constant index of refraction. Around these respective central regions of constant index, the lens has a radial difference in refractive index in the regions 1a and the plane-parallel plate has a radial difference in refractive index in the regions 2a. From FIG. 1 it can be noted that the aperture rays which image an axial image point 3 have a smaller height at the points of incidence of the lens and of the plane-parallel plate than the rays imaging an off-axis image point 4.

Figure 3:
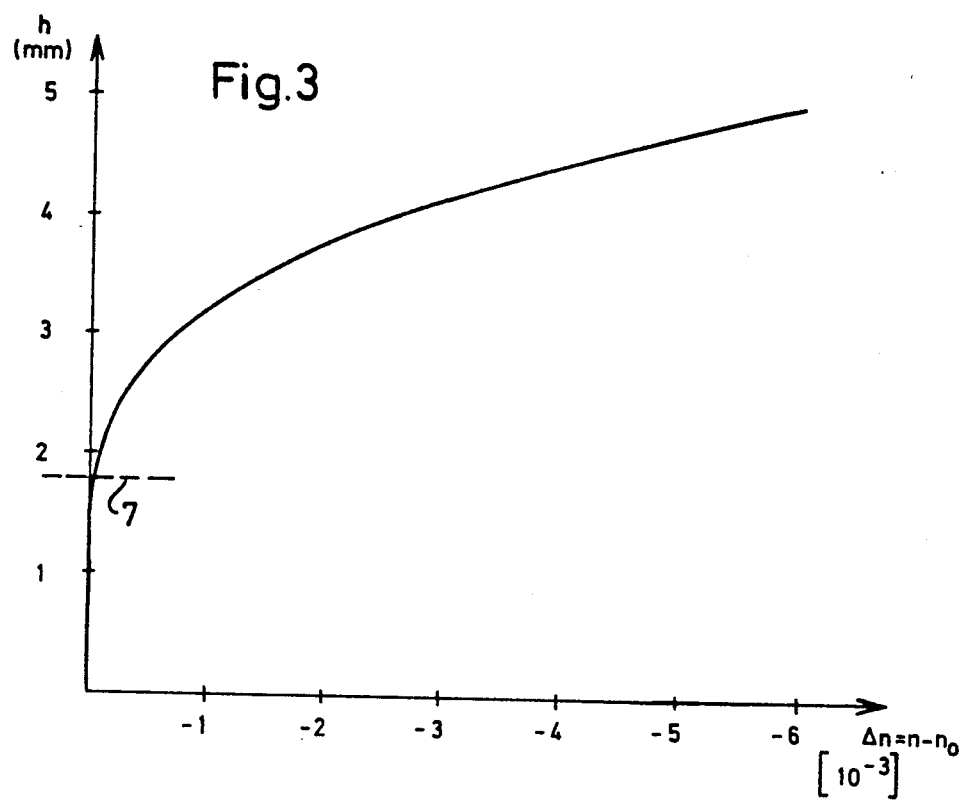
FIG. 3 is a graph illustrating the dependence of the difference in refractive index on the diameter of the gradient plate used in the example of FIG. 2.

Together with the variation of the difference in refractive index shown in FIG. 3 the image defects of the off-axis region can be favorably affected by the positioning of the optical elements shown in FIG. 1, since these rays pass through the part of the lens and plate which has a radial difference in refractive index, while the axial rays pass through the central regions of lens and plate, which have a constant refractive index.

Figure 2:
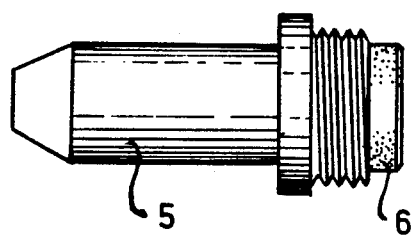
FIG. 2 shows the arrangement in accordance with the invention of a plane-parallel plate with radial difference in refractive index behind the last member of a microscope objective.

In FIG. 2, a microscope objective is shown schematically at 5. Behind the rear optical surface of this objective there is a plane-parallel gradient plate 6 for the correction of off-axis image defects, particularly for the correction of "oblique pencils."

The diagram of FIG. 3 shows the dependence of the difference in refractive index of the gradient plate used in FIG. 2 on the radius of the plate. The height 7 of the aperture ray extends at a radius of about 1.8 mm. The function follows the equation $$n = n_o \cdot e^{Kh}$$

Figure 4:
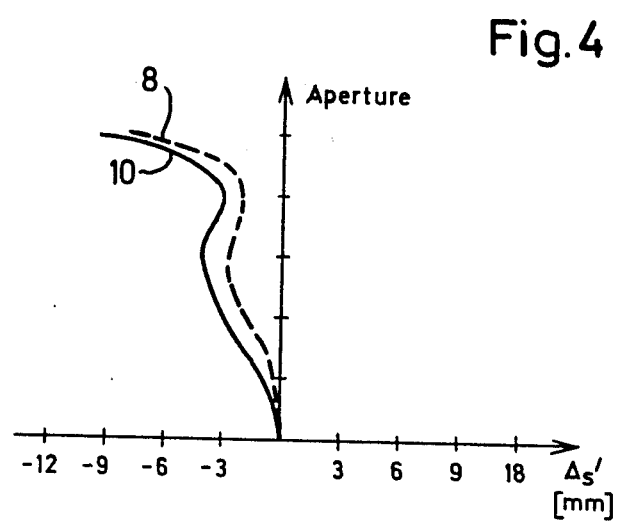
FIG. 4 shows the influence of the gradient plate employed in the invention on the spherical aberration of the optical system.
Figure 5:
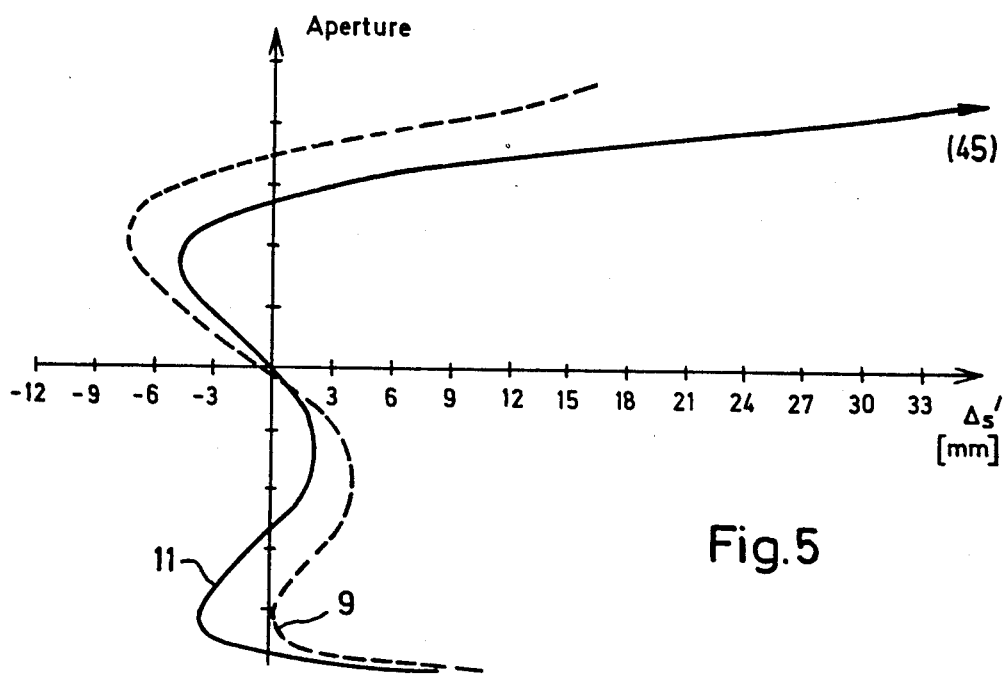
FIG. 5 shows the influence of the gradient plate used in the invention on the coma of an optical system.
Figure 6:
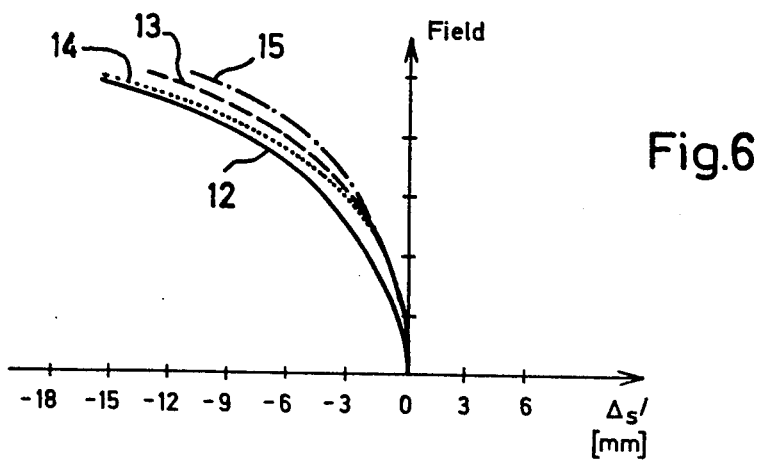
FIG. 6 shows the influence of a gradient plate used in the invention on the astigmatic aberration of an optical system.

FIGS. 4 to 6 respectively show the correction curves for spherical aberration, coma, and astigmatism of the microscope objective shown in FIG. 2, both with and without gradient plate. The correction curves for spherical aberration and for coma of the objective without gradient plate are shown by the solid line curves 10 and 11, respectively, in FIGS. 4 and 5. The corresponding correction curves for the objective provided with gradient plate in accordance with the invention are shown by the broken line curves 8 and 9, respectively.

FIG. 6 shows the tangential and sagittal correction curves for the astigmatism of the microscope objective shown in FIG. 2, both with and without gradient plate. The sagittal correction curve without gradient plate is the solid line curve 12, and the sagittal curve with gradient plate is the broken line curve 13. The tangential correction curve without gradient plate is the dot-dash curve 15, and the tangential correction curve for the objective with gradient plate is the dotted line curve 14.

It is usually preferred to place the optical element which has the radial difference in refractive index (i.e., either a lens or a plane-parallel plate) in the optical system at or in the vicinity of the location of the diaphragm in the system, or at or near the theoretical location of the diaphragm or stop even if the optical system does not actually have a diaphragm.

What is claimed is:

1. An optical system having at least one element of so-called gradient glass having a radial difference in refractive index, characterized by the fact that the radial difference in refractive index of said element is substantially in accordance with the formula $$n = n_o \cdot e^{Kh}$$

wherein the independent variable h represents the radial distance of a point of the optical element from the central axis of such element, the dependent variable n represents the index of refraction of the element at that point, K represents a constant material-dependent factor of the gradient glass element, and $n_o$ is the index of refraction of the gradient glass element on its central axis, and e represents the irrational number 2,7182818.

2. An optical system according to claim 1, characterized by the fact that the element with radial difference in index of refraction is positioned at a place in the optical system where the aperture rays imaging an axial image point are of lesser height than the rays imaging an off-axis image point.

3. An optical system according to claim 2, characterized by the fact that the element with radial difference in refractive index is developed as a lens having at least one curved limiting surface.

4. An optical system according to claim 1, characterized by the fact that the element with radial difference in refractive index is developed as a plane-parallel plate.

5. An optical system according to claim 4, characterized by the fact that a plane-parallel plate is provided in at least one of the air spaces of the optical system.

6. An optical system according to claim 4, characterized by the fact that a plane-parallel plate with radial difference in refractive index is arranged behind the last optical surface of the system.

7. An optical system according to either claim 3 or claim 4, characterized by the fact that the element with radial difference in refractive index is arranged in the vicinity of the locus of the diaphragm.

* * * * *